J. M. DODGE.
CHAIN.
APPLICATION FILED JAN. 6, 1912.
1,067,166.
Patented July 8, 1913.
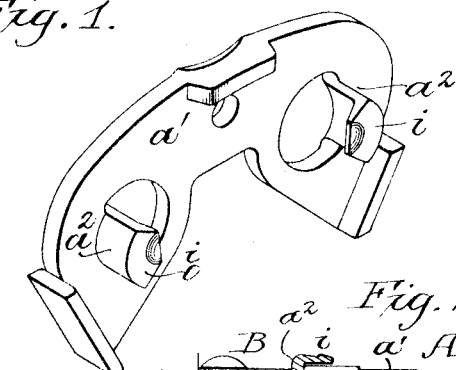
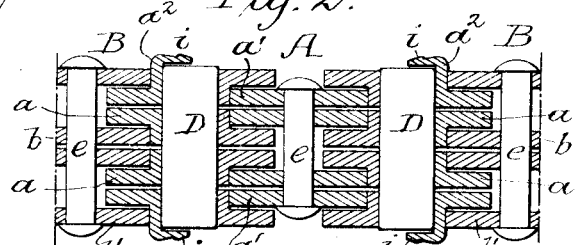
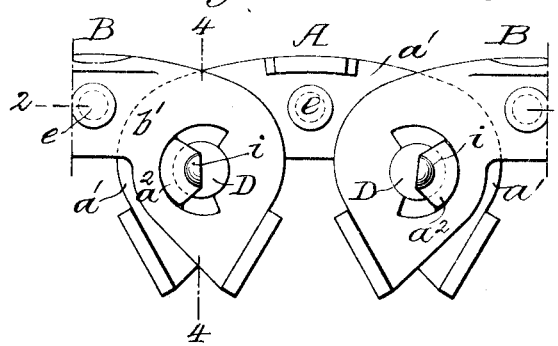
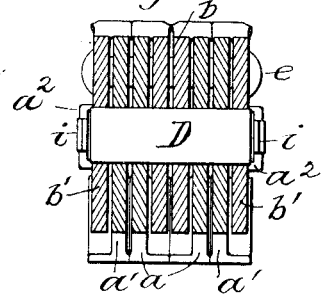
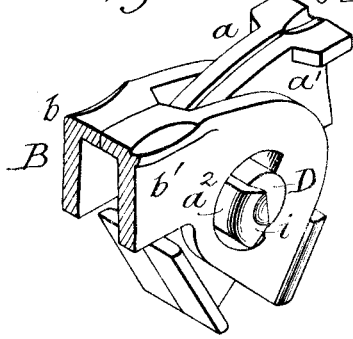
Witnesses—
William H. Burrows.
Nils A. Burrows.
Inventor.
James M. Dodge.
by his Attorneys.
Howson & Howson

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

CHAIN.

1,067,166.  Specification of Letters Patent.  Patented July 8, 1913.

Application filed January 6, 1912. Serial No. 669,865.

*To all whom it may concern:*

Be it known that I, JAMES M. DODGE, a citizen of the United States, residing in Philadelphia, Pennsylvania, have invented certain Improvements in Chains, of which the following is a specification.

My invention relates to certain improvements in drive chains and particularly to the means for retaining the pivot pin against longitudinal movement.

In the class of drive chains to which my invention relates it is not desirable to use the pivot pin as a means of fastening the link plates together; these link plates are secured together by separate means and the pivot pin is made of hard metal, preferably of an even diameter throughout, but the pivot pin must be retained against longitudinal movement in the links.

The object, therefore, of my invention is to provide a means for retaining the pins against longitudinal movement, and this object I attain by providing one set of link plates with means which will extend over the ends of the pins so as to retain them against longitudinal movement.

In the accompanying drawing: Figure 1, is a perspective view of my improved chain link plate; Fig. 2, is a sectional plan view of the chain on the line 2—2, Fig. 3; Fig. 3, is a side view of the chain; Fig. 4, is a sectional view on the line 4—4, Fig. 3; Fig. 5, is a detached sectional perspective view; and Fig. 6, is a sectional view showing a protecting plate attached to the chain.

A and B are the links of the chain. The links A each consists of a series of plates $a$ and $a'$, and the links B each consists of a series of plates $b$ and $b'$; the plates are preferably arranged as shown in Fig. 2, and the plates $a$, $a'$ are pivotally connected to the plates $b$, $b'$ by pivot pins D, and are held laterally by rivets $e$ or other fastenings, as I prefer to allow the pivot pins to turn freely and to have a slight longitudinal movement in the links. I prefer to make the pivot pins of an even diameter throughout and to make them of hard metal.

The link plates shown in the drawings are provided with teeth which mesh with the teeth of sprocket wheels around which the chain passes. Each tooth is preferably provided with an extended bearing, and each plate has an extended bearing for the pivot pin. In order to retain the pin in position longitudinally, I provide the extended bearings $a^2$ of the side link plates $a'$ of the links A with in-turned lips $i$. These extended bearings pass through openings in the side link plates $b'$ of the links B and the in-turned lips $i$ extend over the ends of the pivot pins D, as clearly shown in Figs. 2 and 5. The parts are so proportioned that while the pivot pins are held in position they are allowed a slight free longitudinal movement, so as to permit floating and to prevent cutting. In the present instance the link plates are made by punching and pressing the metal from a blank, and the metal pressed from the blank to form the pivot pin opening of the link plates $a'$ is utilized not only to form the extended bearing but also to form the in-turned lip $i$. In some instances the link plate may be made of cast metal or the lip may be secured to the extended bearing by welding. In Fig. 6, I have shown a protecting plate $f$ having openings into which the in-turned lips extend. This plate is used when it is advisable to protect the lips. While I have shown the link plates held laterally by rivets, it will be understood that bolts, clips, or other devices may be used.

I claim:—

1. A chain link plate having an opening for a pivot pin and having a laterally extending segmental bearing made integral with the link plate; and an inturned lip extending from the outer end of the bearing and projecting over the pivot pin opening.

2. A chain link plate having two openings for pivot pins and having laterally extending segmental bearings made integral with the link plate; each bearing having an inturned lip at its outer end projecting over a pivot pin opening and forming retainers for the pivot pins.

3. A chain made up of a series of link plates; pivot pins connecting the links formed by said plates, the side plates of alternate links having openings at one side of the pivot pins and the side plates of the other links having projections extending through the openings in the first mentioned plates; with lips on the projections extending over the ends of the pivot pins.

4. A chain made up of a series of link plates; pivot pins connecting the links formed by said plates, the side plates of alternate links having openings at one side of the pivot pins and the side plates of the other links having projections extending through the openings in the first mentioned plates; lips on the projections extending over the ends of the pivot pins; and protecting plates on the first mentioned links having openings into which the lips of the side plates of the other links extend.

In testimony whereof, I have signed my name to this specification, in the presence of two subscribing witnesses.

JAMES M. DODGE.

Witnesses:
 Jos. H. Klein,
 Wm. A. Barr.